United States Patent [19]
Kahilahti et al.

[11] Patent Number: 5,094,280
[45] Date of Patent: Mar. 10, 1992

[54] DISK CHIPPER FOR THE PRODUCTION OF WOOD CHIPS

[75] Inventors: Matti Kahilahti, Lahti; Pekka Kokko, Hollola; Ari Hannimaki, Hollola; Kari Jaaskelainen, Hollola, all of Finland

[73] Assignee: Kone Oy, Helsinki, Finland

[21] Appl. No.: 701,907

[22] Filed: May 17, 1991

[30] Foreign Application Priority Data

May 18, 1990 [FI] Finland ................................ 902482

[51] Int. Cl.⁵ ........................ B27C 1/00; F16H 37/06
[52] U.S. Cl. ........................ 144/176; 74/661; 144/162 R; 144/371; 318/102
[58] Field of Search ............ 144/162 R, 176, 373; 74/661; 318/102, 103; 241/92, 278 R

[56] References Cited

U.S. PATENT DOCUMENTS

| | | | |
|---|---|---|---|
| 3,810,555 | 5/1974 | Bakker et al. | 144/176 |
| 3,866,843 | 2/1975 | Lunn | 144/176 |
| 4,774,441 | 9/1988 | Toyomasu et al. | 318/102 |
| 4,929,165 | 5/1990 | Inaba et al. | 74/661 |

*Primary Examiner*—W. Donald Bray
*Attorney, Agent, or Firm*—Sughrue, Mion, Zinn Macpeak & Seas

[57] ABSTRACT

A disk chipper for the production of wood chips, consisting of a rotatable chipping disk supported on an axle driven by at least one drive machine. The disk chipper of the invention is so implemented that at least three motors are drivably coupled to the axle of the chipping disk by means of a gear assembly, preferably a spur gear assembly.

5 Claims, 4 Drawing Sheets

DISK CHIPPER FOR THE PRODUCTION OF WOOD CHIPS

BACKGROUND OF THE INVENTION

The present invention relates to a disk chipper for the production of wood chips.

The wood chips used as raw material in the production of chemical pulp and TMP (Thermo-Mechanical Pulp) are produced by chipping round wood by means of a chipper. Among the previously known types of chipper, the so-called disk chipper is the most commonly used.

The basic structure of the disk chipper consists of a rotating chipping disk mounted on a horizontal or slightly inclined axle supported by bearings. The chipping disk is typically a steel plate rotating in a vertical or nearly vertical position. The disk is provided with radial or nearly radial holes and chipping blades are attached to the rear edges of these holes, as seen in the direction of rotation. This disk and its axle are supported by bearings on a fixed frame. The frame is also provided with a feed mouth for feeding the logs onto the chipping disk. At the bottom of the feed mouth, at a position closest to the chipping disk, is a counter blade against which the log rests while chipped by the blades in the chipping disk.

The chipping disk is rotated by means of a drive machine. This may be a synchronous motor connected to the axle by a coupling, in which case the disk has the same rotational speed as the motor. Another commonly used arrangement is one in which the motor is connected to the primary shaft of a gear box connected to the chipper axle by a coupling. In this arrangement, the motor rotates at a higher speed than the disk. In another previously known disk drive, the gear box has two primary shafts driven by respective driving motors.

The amount of energy required for the chipping depends on the strength of the wood and is therefore different for different varieties of wood. Typical characteristic chipping energy levels for different types of wood variety are as follows:

| | |
|---|---|
| coniferous wood | 6000-8000 kJ/M$^3$ s.m. |
| hardwood | 8000-10000 kJ/m$^3$ s.m. |
| tropical special wood varieties | 10000-12000 kJ/m$^3$ s.m. | where m$^3$ s.m. means solid meters.

When the wood variety to be chipped is known, and the capacity of the chipping line has been determined, the power required by the chipper under normal circumstances can be calculated by the equation:

$$P = Q * p$$

where
$Q$ = capacity [m$^3$ s.m.]
$p$ = characteristic chipping energy [kJ/m$^3$ s.m.]

The maximum power required by the chipper occurs when a log of the maximum size is fed into it. The maximum power requirement can be calculated as follows:

$$P_{max} = (D/2)^2 * \pi * l * Z * n * 60 * p$$

where
$D$ = diameter of log [m]
$l$ = chip length [m]
$Z$ = number of chipping blades
$n$ = speed of rotation of the chipping disk [r/min]

The chipping line capacity Q typically varies between 200-300 m$^3$ s.m./h, for which the average power requirement is in the range of 390-680 kW.

Similarly, the maximum log diameter acceptable to the chipper is D = 800-900 mm. The number of chipping blades commonly used is 12 and the speed of rotation of the chipping disk 240-300 r/min. This means that the maximum power requirement in the case of coniferous wood and 24 mm chip length is 4050-6415 kW.

From this it can be seen that the maximum power requirement is nearly ten times that of the normal input power. In normal use, such high power levels are extremely seldom needed. The average diameter of logs used in the production of wood pulp varies from plant to plant between D = 100-250 mm. However, as the chipper must be able to handle even the occasional very large logs, the installed power of the chipper is determined by the maximum log size. The decisive factor in determining the power requirement is expressly the high torque required by the maximum log size, and the drive machine must be capable of generating a corresponding torque.

The motor to be used with a chipper is selected by determining the torque required by the maximum log size. On the basis of this torque, the drive motor is so selected that the break-down torque of the motor is higher than the required torque.

For example, if:
$D$ = 800 mm (coniferous wood)
$l$ = 22 mm
$Z$ = 12 pcs
$n$ = 240 r/min
and the chipping line capacity is assumed to be Q = 300 m$^3$ s.m./h, then
$P$ = 583 kW
$P_{max}$ = 3715 kW
$M_{max}$ = 147.84 kNm Choosing a gear with a transmission ratio of 6.25, which is advantageous because it allows a motor with the standard rotational speed of 1500 r/min to be used, means that the motor must be able to generate a torque of:

$M_m = M_{max}/i$  where $i$ = transmission ratio
    = 23654 Nm.

If a gear box with two primary shafts driven by respective motors is selected, then each motor must be able to generate a torque of $M/hd\ m/2 = 11827$ Nm This corresponds to a maximum motor power of $P = (M_m/2) * (2 * \pi * n)/60$
  = 1858 kW If the motor has a break-down torque factor of 2, then when standard motors are selected:

$P_n = 1000$ kW (for each of 2 motors)

Since the selection of motor size is based solely on the break-down torque produced by the motor, the break-down torque factor of the motor plays an essential role in the determination of motor size.

Because of the questions of compatibility and spare parts, standard motors are generally preferred. In the standard motor series, motors in the lower power range (250-450 kW) are designed for higher break-down torque factors than those in the highest power range (500-1000 kW). This means that motors in the higher power range cannot be used as efficiently as those of the lower power range, thereby requiring a substantial overcapacity in terms of the installed power. Additionally, high power motors require very high peak currents during start-up, thereby demanding the use of large, and expensive, power supplies. Furthermore, in order to reduce peak currents during start-up, high power motors are typically coupled to the disk shaft through a fluid coupling. Hydraulic losses in the fluid coupling substantially reduces the torque actually transmitted to the disk shaft during operation, further reducing the efficiency of the installation.

SUMMARY OF THE INVENTION

An object of the present invention is to provide a disk chipper in which the installed power is reduced, as compared to known installations, without reducing the capacity of the chipper.

Another object of the invention is to provide a high power disk chipper which may be operated using a smaller and less expensive power supply.

Still another object of the invention is to provide a high power disk chipper which does not require a fluid coupling.

The disk chipper of the invention is characterised as comprising: a chipping disk; a disk axle rotatably supported on bearings, said chipping disk being fixedly disposed on said disk axle; at least three motors disposed symmetrically about the axis of said disk axle; at least one drive machine comprising respective gear assemblies adapted to drivably couple said at least three motors to said disk axle; and a power supply for controlling the supply of electrical power to each of said at least three motors, said power supply being adapted to start each of said motors sequentially so as to reduce the peak current during start-up of the disk chipper.

The disk chipper of the invention therefore comprises several low power range motors instead of one or two high power range motors. For instance, the two 1000 kW motors discussed in the drive in the calculation example above may, according to the invention, be replaced with four 400 kW motors. This results in a 400-kW reduction in the installed power. However, because of the higher break-down torque factor of the smaller motors, the maximum torque available is 3055 Nm higher and therefore the overall torque reserve of the chipper is larger.

In addition, by using several small motors, peak current loads during start-up can be reduced through sequential starting. The lower start-up currents permit the use of a smaller, and therefore less expensive, power supply. Furthermore, the need for a fluid coupling is eliminated, thereby permitting the use of either direct or geared couplings and increasing the efficiency of torque transmission to the disk shaft.

BRIEF DESCRIPTION OF THE DRAWINGS

Preferred embodiments of the invention will now be described in detail with reference to the appended drawings, in which.

DETAILED DESCRIPTION OF THE PREFERRED EMBODIMENTS

Figure 1:
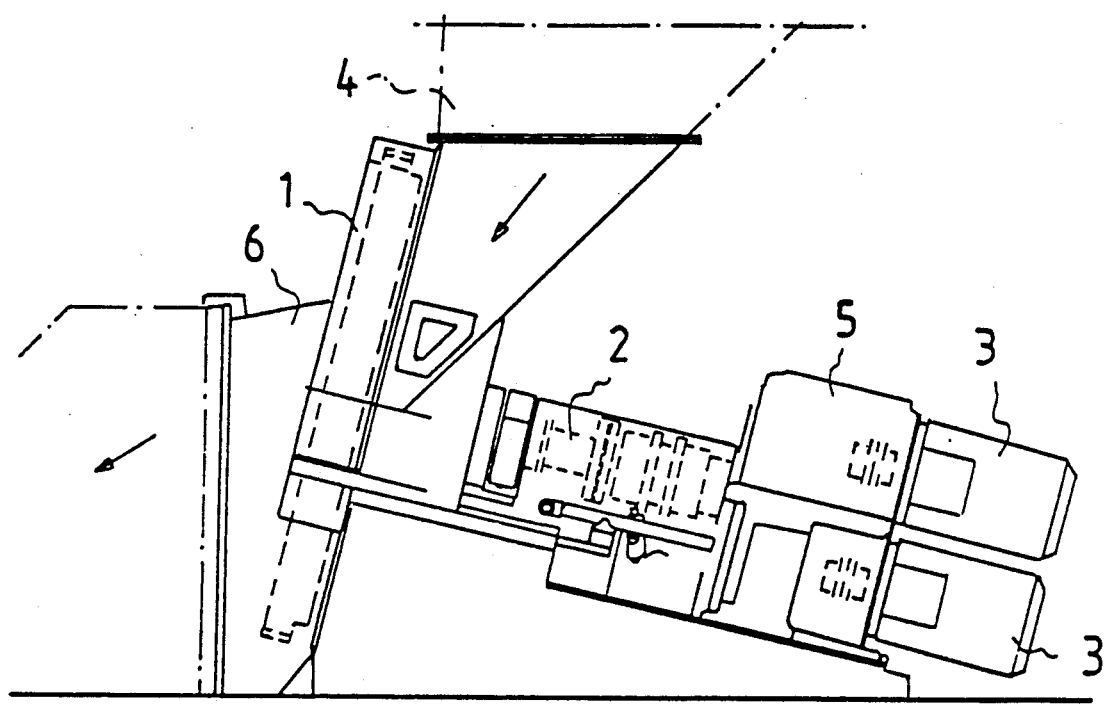
FIG. 1 shows a schematic lateral view of a first embodiment of the disk chipper according to the invention.
Figure 2:
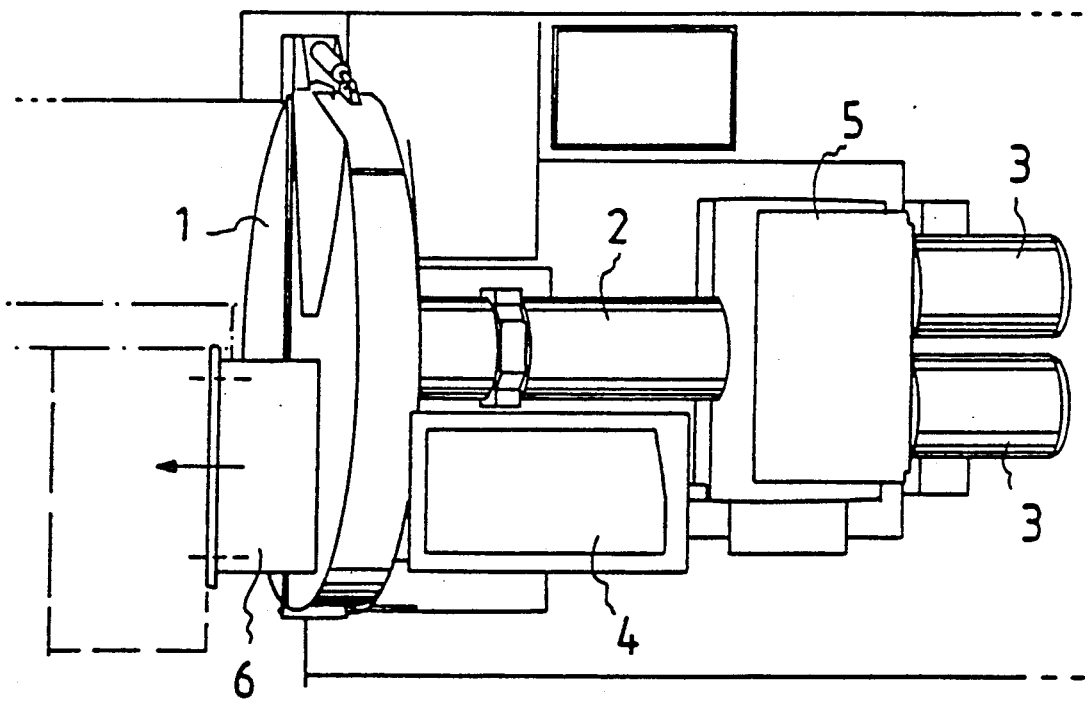
FIG. 2 illustrates a schematic top view of the disk chipper according to the first embodiment of the invention.

Referring to FIG. 1, the disk chipper is provided with a revolving chipping disk 1, which in this embodiment is mounted on a slightly inclined rotating axle 2. The chipping disk 1 consists of a steel plate rotating in a nearly vertical plane and provided with radial or nearly radial holes produced in a known manner. The chipping blades (not shown) are attached to the rear edges of these holes, as seen in the direction of rotation. The chipping disk 1 and its axle 2 are supported by bearings on a fixed frame, which is also provided with a feed mouth 4 for feeding the logs onto the chipping disk. At the bottom of the feed mouth 4, at a position close to the chipping disk 1, is a counter blade (not shown) against which the log rests while being chipped by the blades in the chipping disk The chips are removed through an exit channel 6.

The chipping disk 1 of the chipper is rotated by a drive machine 5, which in this embodiment comprises four motors 3 coupled to the axle 2. The motors are placed symmetrically about the imaginary extension of the axle in the rear part of the drive machine. More particularly, the motors are placed at 90° intervals on the same circle. Naturally, if three motors were used, they would be placed at intervals of 120°. An advantageous motor power for each motor is e.g. 315 kW, in which case the total installed power of the disk chipper is 1260 kW. Naturally, the motor power may vary, preferably between 200-400 kW, but the essential point is that the disk chipper of the invention can use smaller motors than earlier solutions.

Figure 3:
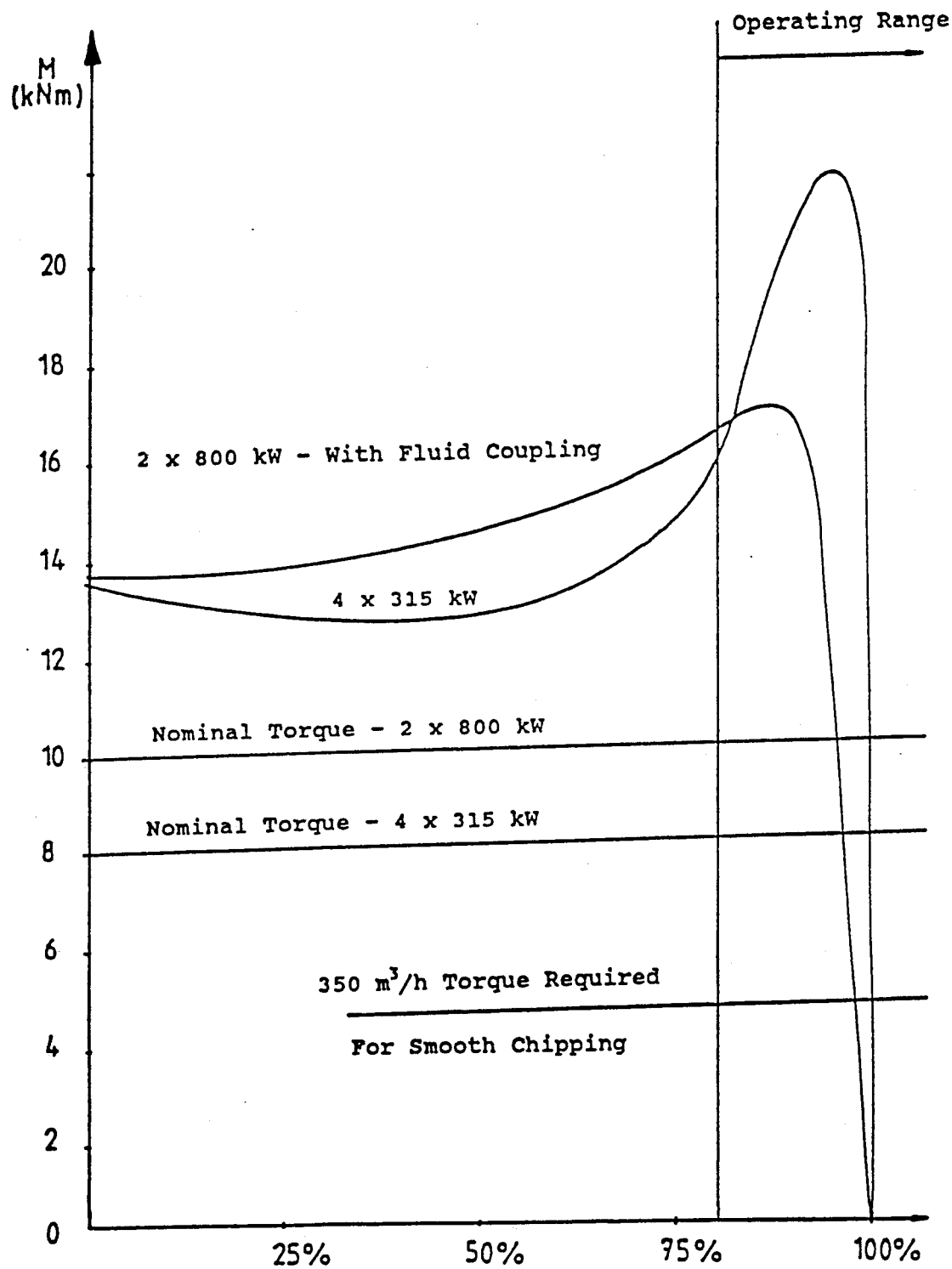
FIG. 3 shows a diagrammatic comparison between a previously known installation and an installation according to the invention, of the torque available on the primary side of the gear.

The curves in FIG. 3 represent the torque available on the primary side of the gear in a state-of-the-art solution and in the solution of the invention. As an example representing the state of the art, a disk chipper with two motors of a nominal power of 800 kW has been selected. As an example representing the present invention, four standard motors with a nominal power of 315 kW each have been selected.

For two 800 kW motors:

$P = 800$ kW
$f = 2.0$ (where $f$ = break-down Torque factor)

-continued $n = 1500$ rpm the nominal torque for each motor is:

$$M_{nom} = \frac{P}{(2\pi n)/60} = 5,095.5 \text{ Nm}$$

and the maximum torque for each motor is:

$$M_{max} = f \cdot M_{nom} = 10,191 \text{ Nm}$$

For four 315 kW motors:

$P = 315$ kW
$f = 2.7$ (where $f$ = break-down Torque factor)
$n = 1500$ rpm the nominal torque for each motor is:

$$M_{nom} = \frac{P}{(2\pi n)/60} = 2006 \text{ Nm}$$

and the maximum torque for each motor is:

$$M_{max} = f \cdot M_{nom} = 5417 \text{ Nm}$$

This comparison is summarised in the following table:

| Motors | Total Power | Nominal Torque | Max. Torque |
| --- | --- | --- | --- |
| 4 × 315 kW | 1260 kW | 8024 Nm | 21669 Nm |
| 2 × 800 kW | 1600 kW | 10191 Nm | 20382 Nm |

It can be seen from the above calculations, and the curves shown in FIG. 3, that in this example the nominal torque in the case of previously known techniques is approximately 10 kNm and the nominal torque in the solution of the invention approximately 8 kNm. However, the maximum available torque in the solution of the invention is approximately 6% higher than in the conventional method, in spite of the fact that the total installed power is approximately 20% lower. Furthermore, in practice the maximum torque on the primary shaft in the conventional solution is considerably lower than when four smaller motors are used. A drawback with the previously known techniques is the need for fluid couplings, which considerably reduce the maximum torque. As stated before, no fluid couplings are needed in the solution of the invention.

Figure 4:
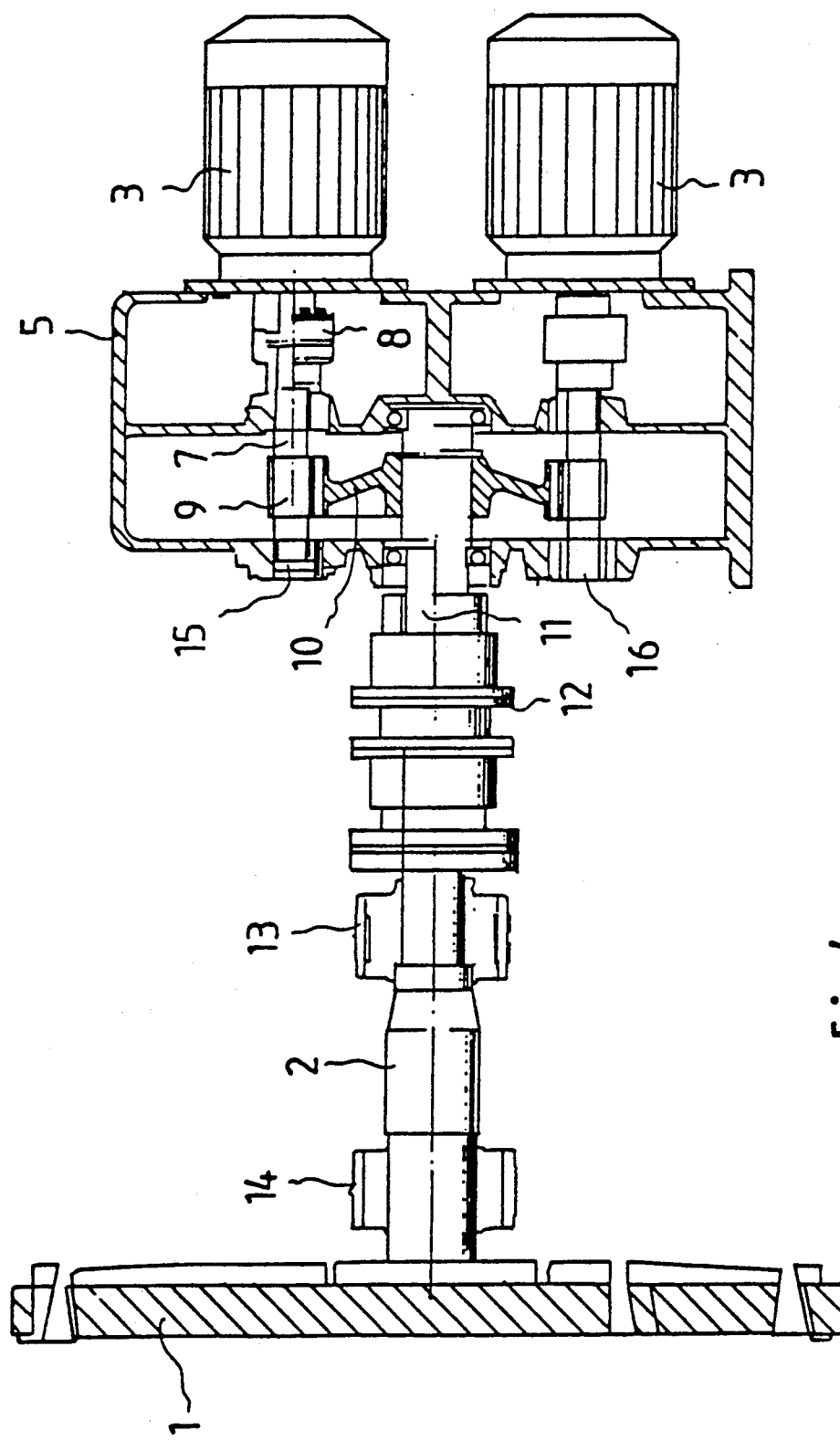
FIG. 4 shows a partially sectioned top view of the disk chipper according to the first embodiment of the invention.

FIG. 4 shows the disk chipper of the invention partly sectioned and without the log feed and chip removal equipment. FIG. 4 is intended to illustrate the principle of power transmission from the motors 3 to the chipping disk 1. The shafts 7 of the motors 3 are provided with flexible couplings 8 to ensure an accurate positioning of the shafts. Further, the shafts 7 are connected to the primary gearwheels 9 of a spur gear assembly, and these engage the secondary gearwheel 10 via their toothing. The axle 11 of the secondary gearwheel is connected to the axle 2 of the chipping disk 1 via a toothed coupling 12. The latter axle 2 is supported by bearings 13 and 14. In this embodiment, no bearing is provided on the opposite side of the chipping disk, although there could be a bearing on that side as well.

Furthermore, the embodiment illustrated by FIG. 4 has a provision for the installation of additional motors at points 15 and 16 on the opposite side of the gear assembly relative to the above-mentioned motors. In this case, the shafts of the additional motors are joined with those of the motors 3 on the opposite side and they thus drive the same primary gearwheels.

Figure 5:
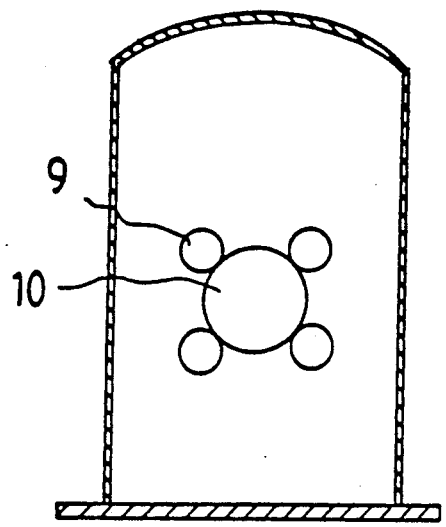
FIG. 5 shows a cross-sectional view of the spur gear assembly.

FIG. 5 shows a cross-section of the spur gear assembly to illustrate how the motor shafts and the primary gearwheels 9 mounted on them are symmetrically placed around the secondary gearwheel 10 of the spur gear assembly. In this embodiment, the primary gearwheels 9 are placed at 90° intervals on the same circle. The essential point is that the primary gearwheels are always placed at even distances, i.e. if there are five motors, the distance between primary gearwheels is 72°. In the case of three motors, the primary gearwheels are placed at 120° from each other, and so on. The toothings on the gearwheels 9, 10 are not shown in this illustration of the basic principle as they are considered to be obvious to a person skilled in the art. In general, FIG. 5 is a greatly simplified representation.

Figure 6:
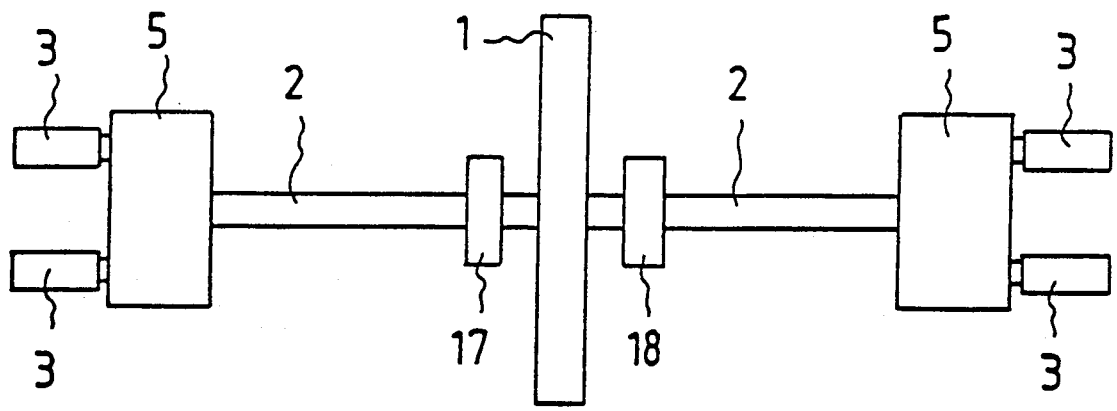
FIG. 6 illustrates a top view of a second embodiment of the invention.

FIG. 6 is a diagrammatic representation of an embodiment in which the axle 2 of the chipping disk 1 is supported by bearings 17 and 18 placed on either side of the disk, thus extending to both sides of it. This embodiment uses two drive machines 5 placed essentially symmetrically relative to the chipping disk. Each drive machine may comprise e.g. two motors 3, in which case the total number of motors is four. Naturally, the number of motors is not restricted to four in this or any other embodiment, but there may be three or more of them as needed.

It will be apparent to a person skilled in the art that different embodiments of the invention are not restricted to the examples described above, but that they may instead be varied within the scope of the following claims. Thus it is apparent that, instead of an oblique position, the disk chipper can just as well be mounted in a horizontal position, in which case the chipping disk has an essentially vertical position. The gearing between the motor shafts and the chipping disk axle need not be a spur gear assembly, although this seems to be the most advantageous solution. Another possible alternative is e.g. a bevel gear assembly. Furthermore, it is not necessary for all the motors to be of the same size, although this must be regarded as the preferable solution.

We claim:

1. A disk chipper for the production of wood chips comprising:
   (a) a chipping disk;
   (b) a disk axle rotatably supported on bearings, said chipping disk being fixedly disposed on said disk axle;
   (c) at least three motors disposed symmetrically about the axis of said disk axle;
   (d) at least one drive machine comprising respective gear assemblies adapted to drivably couple said at least three motors to said disk axle; and
   (e) a power supply for controlling the supply of electrical power to each of said at least three motors, said power supply being adapted to start each of said motors sequentially so as to reduce the peak current during start-up of the disk chipper.

2. A disk chipper according to claim 1, wherein said drive machine comprises four motors arranged symmetrically about the axis of said disk axle.

3. A disk chipper according to claim 1, wherein each one of said motors has a power in the range of 200–400 kW.

4. A disk chipper according to claim 1, wherein said disk axle extends on both sides of said chipping disk and is driven by drive machines disposed on respective ends thereof, each of said drive machines being provided with at least two motors.

5. A disk chipper according to claim 1, wherein said motors are disposed in respective pairs of motors coupled coaxially with one another, each of said pairs of motors being adapted to drive a respective primary gearwheel drivably coupled to said disk axle.

* * * * *